(No Model.)

J. DONOVAN.
HAND CAR.

No. 538,101. Patented Apr. 23, 1895.

Witnesses
L. J. Whittemore
W. F. Barthel

Inventor
James Donovan
By N. S. Maquet & Son,
Att'ys.

UNITED STATES PATENT OFFICE.

JAMES DONOVAN, OF THREE RIVERS, MICHIGAN, ASSIGNOR TO THE ROBERTS, THROP & COMPANY, OF SAME PLACE.

HAND-CAR.

SPECIFICATION forming part of Letters Patent No. 538,101, dated April 23, 1895.

Application filed June 4, 1894. Serial No. 513,447. (No model.)

*To all whom it may concern:*

Be it known that I, JAMES DONOVAN, a citizen of the United States, residing at Three Rivers, in the county of St. Joseph and State of Michigan, have invented certain new and useful Improvements in Hand-Cars, of which the following is a specification, reference being had therein to the accompanying drawings.

The invention consists in the peculiar construction of the clutch between the drive axle of a hand car and the crank shaft thereof, whereby the construction is simplified and improved and whereby the actuating lever or walking beam can be thrown out of gear with the drive axle when desired, all as more fully hereinafter described.

Figure 1:
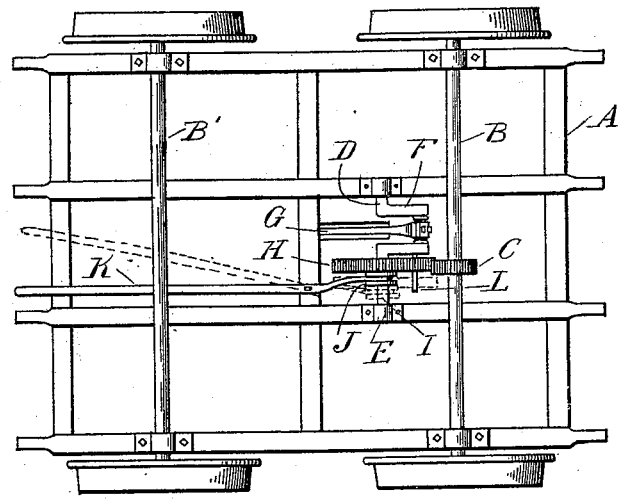
Figure 2:
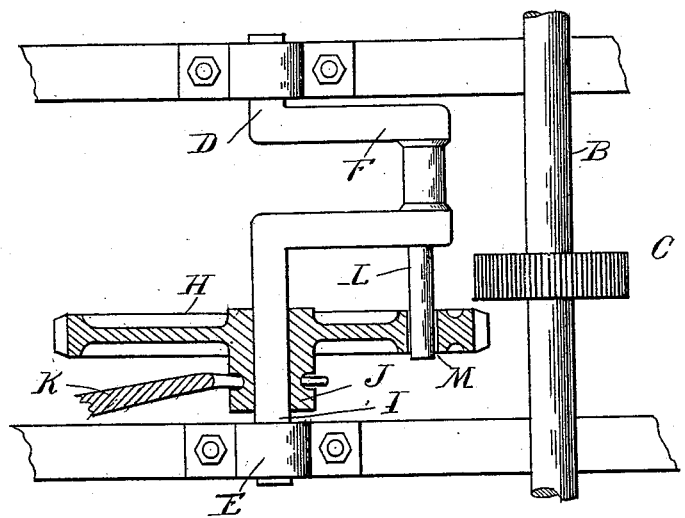

In the drawings, Figure 1 is a bottom plan view of a hand car embodying my invention. Fig. 2 is an enlarged plan partly in section showing the clutch member disengaged.

A is the frame of the hand car.

B and B' are the wheeled axles upon which the frame is supported, the axle B being the drive axle.

C is a gear pinion on the drive axle.

D is a crank journaled in bearings E on the under side of the frame and having a crank F connected by the pitman G with the usual actuating lever above the platform (not shown).

H is a geared wheel sleeved on the squared portion I of the crank shaft and having a grooved collar J on its hub, in which the forked end of the lever K engages for shifting this gear wheel laterally upon the squared section I of the shaft.

L is a pin projecting from the outer end of the crank through a bearing M in the gear wheel.

It frequently happens in the use of hand-cars that it is desirable to load the cars with ties or similar bulky material on each side of the gallows frame, which ties are to be moved but a short distance on the track. In this use with the ordinary construction of walking beam positively geared to the axle but few ties can be placed on the car for the movement of the walking beam as the car is pushed would strike the ties. By having this clutch device between the drive axle and the walking beam or its crank shaft the movement of the walking beam can be prevented and thus the ties piled up on the car as high as desired when the clutch is disengaged.

To disengage the clutch the operator shifts the lever K which moves the gear wheel H on the squared portion I of the crank shaft and out of engagement with the gear pinion C on the drive axle, as shown in Fig. 2. The pin L remains constantly in engagement with the gear wheel and thus forms a crank connection with that gear wheel at all points in the movement of the gear wheel on its shaft.

What I claim as my invention is—

In a hand car, the combination with a wheeled axle, of a pinion thereon, a crank shaft, means for driving the shaft, a lateral pin projecting out from the crank, a sliding gear on the shaft having an opening therein adjacent to its periphery in which the pin slidingly engages, and a lever for moving the gear into and out of mesh with the pinion, substantially as described.

In testimony whereof I affix my signature in presence of two witnesses.

JAMES DONOVAN.

Witnesses:
GEORGE A. ROBERTS,
JAMES B. ROBERTS.